Aug. 15, 1933.  J. ZUBATY  1,922,610
TACHOMETER
Filed June 20, 1928   3 Sheets-Sheet 2
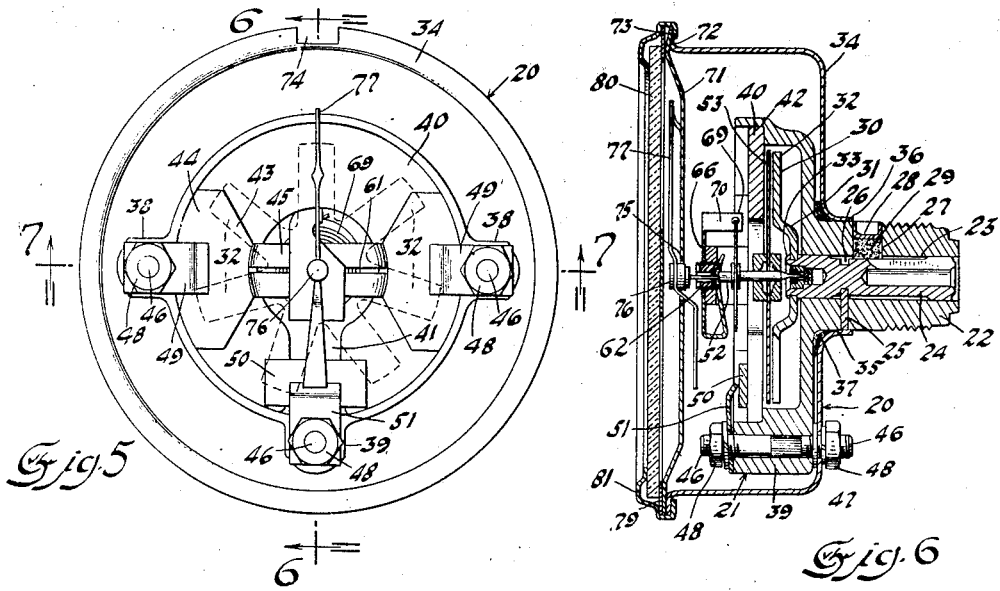
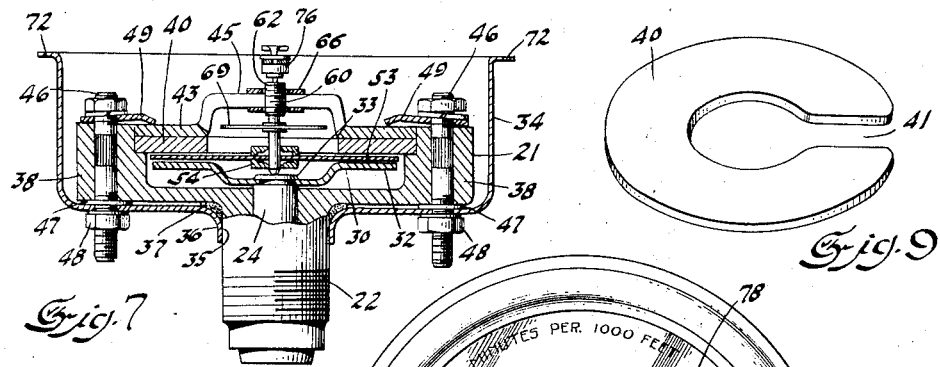
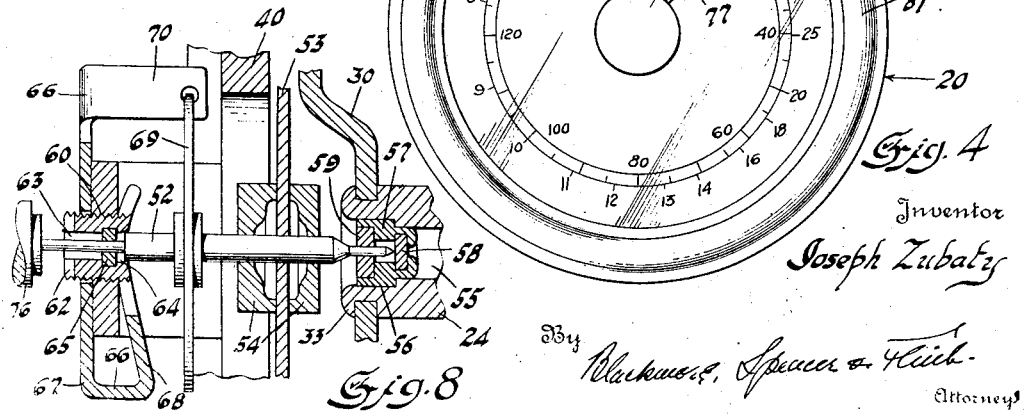
Inventor
Joseph Zubaty Aug. 15, 1933.        J. ZUBATY        1,922,610
TACHOMETER
Filed June 20, 1928     3 Sheets-Sheet 3
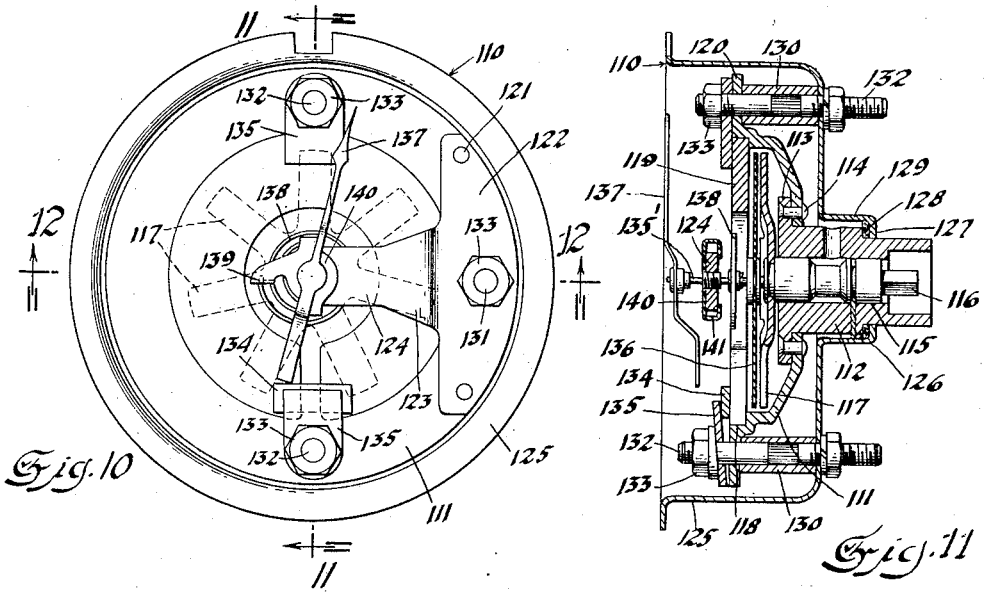
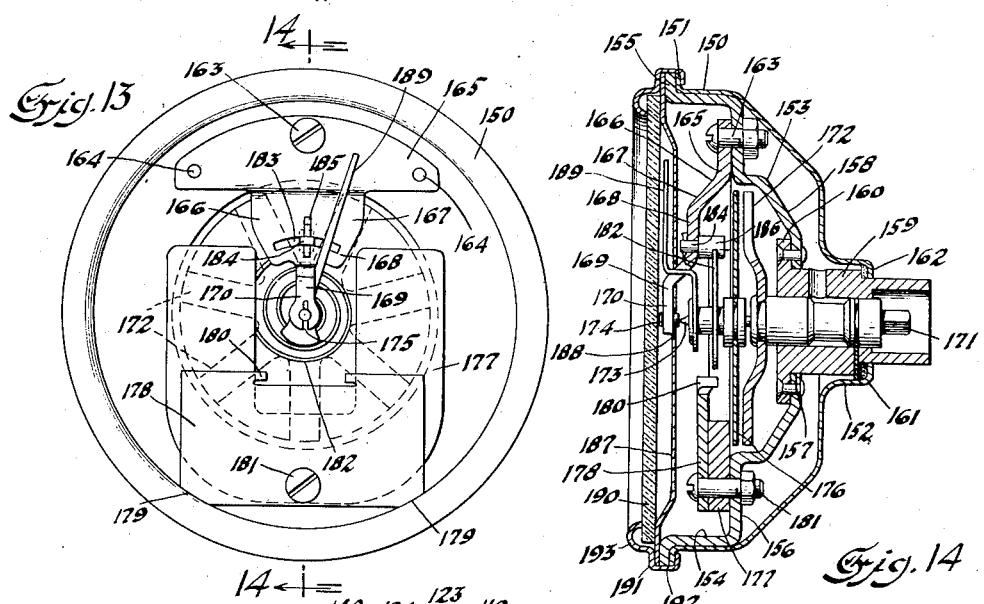
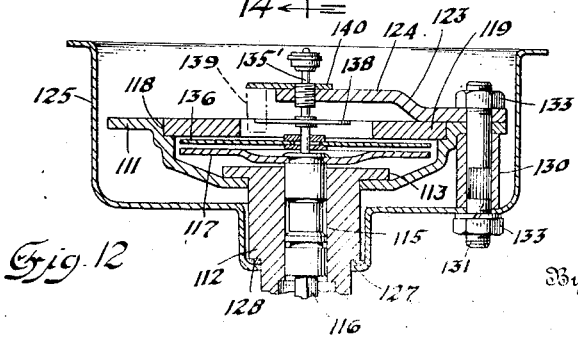
Inventor
Joseph Zubaty Patented Aug. 15, 1933

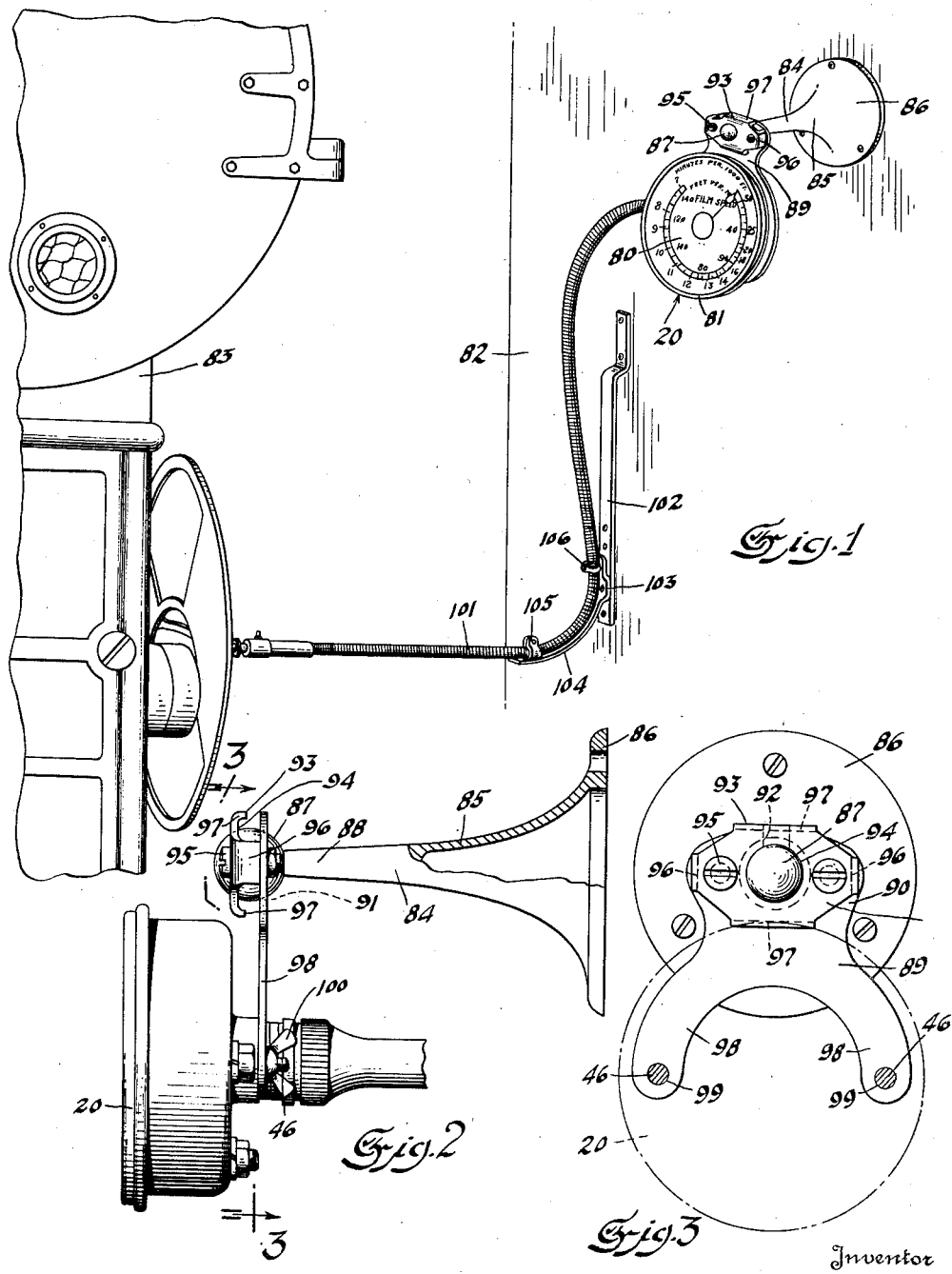

1,922,610

UNITED STATES PATENT OFFICE 1,922,610

TACHOMETER

Joseph Zubaty, Flint, Mich., assignor to A C Spark Plug Company, Flint, Mich., a Company of Michigan Application June 20, 1928. Serial No. 286,987

5 Claims. (Cl. 264—13)

This invention relates to magnetic tachometers.

In the interest of economy in manufacture, instruments of the type described should be composed of a minimum number of parts and these parts should be so constructed that they can be assembled with a minimum of labor and expense. Furthermore, in order to produce an instrument having a high degree of accuracy, the parts should be constructed so that the chances of error or inaccuracy in assembling them will be reduced to a minimum. It is an object of this invention to provide an instrument of the type described which meets the requirements outlined above.

In order to produce an instrument having the characteristics outlined above, in certain embodiments of my invention, I construct the component parts thereof so when they are assembled all of the rotating parts will be coaxial with the magnet frame and casing.

It is another object of the invention to provide certain new and useful improvements in means for securing the component parts of an instrument of the type described in assembled relation.

Further objects of the invention are to provide certain new and useful improvements in the bearings for the rotating parts of instruments of the type described and the means for mounting them, to provide certain new and useful improvements in means for adjusting the tension of the hairsprings of such instruments, and to provide certain new and useful improvements in means for compensating such instruments for errors due to changes in temperature.

Further objects of the invention are to provide certain new and useful improvements in means for mounting instruments of the type described and to provide certain new and useful improvements in means for supporting a flexible shaft by means of which the motion of the shaft whose speed is to be measured may be transmitted to the instrument.

Other objects of the invention, which are too numerous to mention specifically, will be obvious from a persual of the following specification in which are described the embodiments of my invention shown in the accompanying drawings.

In the drawings:

Figure 1 is a more or less diagrammatic view of a moving picture projection booth showing one form of my tachometer arranged to register the speed of the moving film in the projector.

Figure 2 is an enlarged view showing, in side elevation, the tachometer and the mounting bracket therefor in assembled relation.

Figure 3 is a view taken on the line 3—3 of Figure 2.

Figure 4 is a front elevation of the tachometer shown in the preceding figures.

Figure 5 is a front elevation of the tachometer shown in the preceding figures with the face plate, protecting glass, and bezel removed.

Figure 6 is a section through the tachometer shown in the preceding figures taken on the line 6—6 of Figure 5.

Figure 7 is a view mainly in section on the line 7—7 of Figure 5.

Figure 8 is an enlarged fragmentary section taken on the line 6—6 of Figure 5.

Figure 9 is a perspective view of the magnet used in the instrument shown in the preceding figures.

Figure 10 is a front elevation of a modified form of tachometer with the face plate, protecting glass, and bezel removed.

Figures 11 and 12, are, respectively, sections on the lines 11—11, and 12—12 of Figure 10.

Figure 13 is a front elevation of another modified form of tachometer with the face plate, protecting glass, and bezel removed.

Figure 14 is a section through the tachometer shown in Figure 13 taken on the line 14—14 of Figure 13.

Referring particularly to Figures 1—9 of the drawings, the reference character 20 indicates a tachometer which includes a cup-shaped frame 21 which is made of a non-magnetic material. Formed integrally with the frame and of the same material is a bearing member 22 which is coaxial with the frame and extends outwardly from the bottom thereof. The bearing member 22 is provided with a bore 23 which extends from end to end thereof and is coaxial with the frame 21. Journalled in the bore 23 is the drive shaft 24 which is provided in its outer end with a suitably shaped recess into which the end of a flexible shaft, which is adapted to be driven by the shaft whose speed is to be measured, may be inserted to operatively connect the latter with the drive shaft. A suitable key 25, which is seated in a slot in the bearing member 22 and extends into an annular groove 26 in the drive shaft, prevents endwise movement of the drive-shaft with respect to the bearing member. In a transverse bore 27 in the bearing member and held therein by suitable means, such as that indicated at 28, is an oil wick 29 adapted to supply lubricant to the bearing between the drive shaft and the bearing member.

Within the frame is located the rotor 30 which consists of a cup-shaped member 31 provided with a plurality of prongs 32 extending radially outwardly from the upper edge thereof. The inner end of the drive shaft 24 extends into the cup-shaped recess in the frame 21 and there is provided with a reduced portion which extends into an axial opening in the rotor. The inner end of the drive shaft is crimped over the edges of the rotor adjacent the central opening therein, as indicated at 33, and the rotor is thus firmly secured to the drive shaft, as shown in the drawings.

The frame 21 is enclosed in a cup-shaped casing 34 which is coaxial with the frame and through an opening 35 in the bottom of which and an outwardly extending neck 36 surrounding the opening the bearing member 22 extends. The neck fits snugly around the inner portion of the bearing member and maintains the key 25 in position in the annular groove in the drive shaft. To prevent dust entering the case between the frame and the case, there is provided therebetween an annular gasket or washer 37.

Diametrically opposite each other, there are formed on the outer side walls of the frame 21 two bosses 38 and at a right angle to either of the bosses 38 a third boss 39. The magnet 40, which is of the split ring type, having an interpolar gap at 41, is seated in an annular rabbet 42 in the frame concentrically with the rotor 30 and with the interpolar gap opposite the boss 39. A bridge 43, whose length is substantially equal to the diameter of the vertical wall of the rabbet and which includes opposite end portions 44 whose extremities are shaped as arcs of a circle having a diameter equal to that of the vertical wall of the rabbet, is positioned with its opposite end portions located in the rabbet on top of the magnet, each extremity being located adjacent one of the bosses 38. The central portion 45 of the bridge, which connects the end portions 44, is raised with respect thereto in order, as may be seen on the drawings, to provide a space wherein the hair spring 69 may be located.

Studs 46 extend vertically through bores in each of the bosses 38 and 39 and through the bottom of the case, being provided between the frame and the case with integral spacing collars 47. On the opposite ends of the studs 46 are threaded nuts 48 by means of which the frame 21 is held securely in the case. Between the upper nuts 48 on the studs 46, which extend through the bosses 38, and the frame are located clamps 49 through which the studs extend. The opposite ends of these clamps rest on top of the opposite end portions 44 of the bridge 43 and hold the magnet and the bridge securely in the frame. The interpolar gap of the magnet is bridged by a strip 50 of magnetic material having a negative temperature coefficient of magnetic permeability such, for instance, as certain nickel-iron or nickel-copper alloys, which acts to compensate the tachometer for errors due to temperature changes. Between the nut 48 on the stud 46, which extends through the boss 39, and the frame is located a clamp 51 through which the stud extends. The opposite end of the clamp rests on the top of the compensator 50 and maintains it in adjusted position across the interpolar gap of the magnet.

The reference character 52 indicates a spindle which is journalled coaxially with the shaft 24 and carries intermediate its ends and located between the magnet and the rotor a flat speed disk or drag element 53 which is preferably made of an aluminum-magnesium alloy. The disk is clamped securely to the shaft between the two collars 54.

The inner end of the shaft 24 is provided with a bore 55 coaxial therewith and with a counterbore 56 coaxial with the bore 55. Within the counterbore 56 and having a reduced portion extending into the bore 55 is a jewel cup 57 within which and closing the lower end thereof is located an end jewel 58 which is secured in place by crimping the lower end of the cup thereover. Within the upper end of the jewel cup is seated a hole jewel 59 having therethrough an opening coaxial with the drive shaft. The lower end of the spindle 52 is reduced in diameter and extends through the hole jewel 59 and bears at its lower end against the end jewel 58.

Through the intermediate portion of the bridge 43 and coaxial with the bore in the upper end of the shaft 24 is provided a threaded bore 60 which is intersected by a slot 61 extending longitudinally and from end to end of the central portion of the bridge. Through this bore 60 is threaded a jewel holder 62 the pitch diameter of whose threads is somewhat greater than that of the threads of the bore 60 so that when the holder is screwed into the bore the side portions of the bridge on opposite sides of the slot 61 are sprung apart and a radial pressure is applied to the jewel holder which maintains it in any position to which it may be adjusted. The jewel holder is provided with an axial bore 63 extending from end to end thereof and at its lower end with a counterbore 64 coaxial with the bore 63. Within the counterbore 64 and secured therein by crimping the lower end of the holder thereover is a jewel 65 having therethrough an opening coaxial with the bore 63. The upper end of the spindle is reduced and extends through the opening in the jewel and that in the holder to a point above the bridge.

A U-shaped spring adjuster 66 straddles the intermediate portion of the bridge 43 with its upper and lower legs 67 and 68 frictionally engaging the upper and lower surfaces thereof. The upper leg 67 of the adjuster is provided with an opening through which the upwardly extending portion of the jewel holder 62 projects to provide a pivotal mounting for the adjuster. The lower leg 68 is bifurcated and straddles the lower end of the jewel holder 62.

Secured at one end to and spirally surrounding a portion of the spindle 52 between the magnet and the bridge is a hairspring 69. The upper leg of the adjuster extends beyond the side of the bridge opposite that on which the web thereof is located and is there provided with a downwardly projecting portion 70 to which is secured the opposite end of the hairspring 69.

The marginal edge of the face plate 71, which is shaped like a pie plate and carries the speed indicating characters, is seated on an outwardly extending circumferential flange 72 provided on the upper edge of the case 34 and is provided with a struck-out prong 73 engaging in a notch 74 in the flange 72 to prevent relative rotation of the two parts. The speed indicating characters are arranged, as shown in Figures 1 and 4, so as to provide two scales, both of which are arranged concentrically about the pivotal axis of the pointer. The inner scale is marked and graduated to read in units of distance per unit of time and the outer scale is marked and graduated to read in units of time per unit of distance. By means of this arrangement, the single pointer serves to indicate simultaneously both of the above-mentioned rates and the necessity of calculating one from the other is obviated. The face plate is provided with a central opening 75 through which extends the upper end of the spindle 52 which carries a hub 76 to which is secured a pointer 77 having an indicating portion above the face plate and a balance or tail portion below the face plate. There is provided on the face plate a struck-out prong 78 against which the pointer 77 is adapted to engage to prevent its being moved by the hairspring to a point beyond the zero on the inner scale when movement of the rotor ceases. Seated on the upper edge of the face plate, through the intermediary of an annular gasket 79, is a protecting glass 80. The glass, the gasket, and the face plate are secured together and held in place on the case by the bezel 81.

The instrument previously described is intended primarily for use in measuring the speed of the film in a moving picture projection machine, though it is, of course, susceptible to other uses.

In Figures 1–3, the reference character 82 indicates a wall of a projection booth and the reference character 83 a moving picture projection machine located in the booth.

To provide means for mounting the tachometer in a convenient position in the booth in such a manner that it may be angularly adjusted for convenience in reading its indications, I provide a support 84 which includes a pedestal 85 having on one end thereof a base 86 secured to a side wall of the booth and provided on its opposite end with a ball-shaped extremity 87 of considerably larger diameter than the portion of the neck 88 of the pedestal adjacent thereto.

The reference character 89 indicates a supporting plate which may be described as Y-shaped. One of the legs of the Y is appreciably wider than the other two and this leg 90 is provided with an opening 91 therethrough which is intermediate in size between the diameter of the ball-shaped projection and that of the portion of the neck adjacent thereto. A slot 92 which is of slightly larger diameter than the portion of the neck of the pedestal adjacent the ball-shaped projection is provided so that the plate 89 may be positioned, as shown in the drawings, with the lower side of the ball-shaped projection 87 seated in the opening 91. The plate 89 is held in this position on the pedestal by a clamping plate 93 having therethrough a central recess 94 through which a portion of the ball-shaped projection 87 projects. Screws 95 extend through the clamping plate and into the supporting plate clamping the ball-shaped extremity of the pedestal firmly between the two plates. On its ends, the clamping plate is provided with downturned lugs 96 which are adapted to maintain the two plates in approximate parallelism, and on its opposite sides is provided with downturned lugs 97.

In the ends of the legs 98 of the supporting plate 89 are provided openings 99 which are spaced apart a distance equal to that between the studs 46 which extend through the bosses 38 on the frame of the tachometer and which, it will be noted, extend outwardly beyond the nuts 48 on the outside of the case 34.

To mount the tachometer on the support 84, the former is positioned with the bearing member 22 and neck 36 located between the legs 98 and with the extensions of the studs 46 projecting through the openings 99 in these legs and is secured to the plate 89 by the wing nuts 100. It will be noted that when the tachometer is mounted on the support it may be adjusted angularly in any direction with respect thereto by virtue of the universal connection between the plate 89 and the pedestal so that the face of the instrument may be positioned so that it may be conveniently observed by the operator of the projector.

A flexible drive shaft which is housed in a flexible housing 101 is connected in any suitable manner at one end to a shaft of the projector which rotates at a known rate of speed with respect to the speed of the film and at its other end to the drive shaft 24 of the tachometer so that the speed of the moving film is registered by the tachometer. To support the housing and the flexible shaft between their ends, there is provided a bracket 102 which includes a Z-shaped member 103, one leg of which is secured to a wall of the booth and to the other leg of which is adapted to be pivoted at any one of a plurality of points, as indicated in the drawing, a curved member 104 carrying clamps 105 and 106 which are detachably secured around the housing 101 adjacent the opposite ends of the member 104. This bracket, as is obvious, will relieve the tachometer of a great portion of the weight of the flexible shaft and the housing and will, due to the pivotal connection between the two parts thereof, support the flexible shaft and the housing in such a manner as not to produce any kinks or sharp bends therein.

Upon movement of the film in the projection machine, the flexible shaft will impart a rotary movement to the rotor 32 which movement will cause eddy currents to be set up in the speed disk or drag element 53 which will cause it and the pointer 77 to be displaced from their positions of rest, against the resistance of the hairspring 69, a distance proportional to the speed of the rotor so that the speed of the moving film will be indicated on the face of the tachometer by the pointer. The tension of the hairspring, it is obvious, may be adjusted by moving the adjuster 66, which will remain in any position to which it may be adjusted by reason of the frictional contact of its arms with the bridge 43, about its pivot on the jewel holder 62. The jewel holder can be adjusted axially, by screwing it up or down, to limit the end-play of the spindle 52, and will remain in any position to which it may be adjusted by reason of the axial pressure exerted on it by the portions of the bridge on opposite sides of the slot 61.

The compensator 50 which bridges the interpolar gap of the magnet provides a path whereby a portion of the flux of the magnet is shunted away from the rotor and speed disk. Since it is characteristic of the material of which the shunt is made that its magnetic permeability decreases with an increase in temperature and increases with a decrease in temperature, more of the flux of the magnet will be shunted through it and away from the speed disk and rotor when the temperature is low than when the temperature is high, and the shunt will therefore act to compensate the instrument for errors due to changes in temperature, since the speed disk is made of a material whose electrical resistance increases with an increase in temperature and decreases with a decrease in temperature. It is obvious that the shunt can be adjusted so as to position more or less of the material of which it is made across the interpolar gap in order to vary the amount of magnetic flux shunted away from the speed disk and rotor thereby.

In Figures 10-12, the reference character 110 indicates a tachometer which includes a cup-shaped frame 111 having a central opening in the bottom thereof. A bearing member 112 having a flange 113 seated on the edges of the frame around the opening and secured thereto by rivets 114 extends through the bottom of the frame and is provided with a bore 115 co-axial with the frame and extending from end to end of the bearing member. Journalled in the bearing member 112 and prevented from endwise movement therein and adapted to be lubricated in the same manner as the corresponding part shown in Figures 1-9 is the drive shaft 116 whose outer end extends into an enlarged bore in the reduced outer end of the bearing member and is made square in cross section so that it may be connected to a suitable driving means.

Within the frame is located a rotor 117 which is similar to the corresponding part shown in Figures 1-9 and similarly secured to the drive shaft.

Seated in a rabbet 118 formed adjacent the top of the frame 111 and concentric with the rotor is the magnet 119 which is of the same type as that heretofore described. Secured to a circumferential flange 120 on the frame 111 by rivets 121 is the cross arm 122 of a T-shaped bracket 123. The leg 124 of this bracket is raised above the plane of the cross arm and extends to and slightly beyond a point vertically above the drive shaft 116.

The frame is enclosed in a cup-shaped casing 125, through an opening in the bottom of which and through an outwardly extending neck 126 which surrounds the opening, the bearing member 112 extends. The neck is provided at its outer end with an inturned circumferential flange 127 on which, through the intermediary of a felt washer 128 which prevents the entrance of dust or dirt into the casing, the shoulder 129 between the enlarged and reduced portions of the bearing member 112 rests.

To maintain the frame 111 spaced from the casing 125, there are provided between the flange 120 and the bottom of the casing three spacing sleeves 130. Through the center of the cross arm of the T-shaped bracket 123, through the flange 120, through one of the sleeves 130 and through the bottom of the casing 125 extends a stud 131. Through the flange 120, through each of the other sleeevs 130, each of which is spaced ninety degrees (90°) around the circumference of the frame from the first sleeve and which are diametrically opposite each other, and through the bottom of the casing extends a stud 132. On the opposite ends of the studs 131 and 132 are threaded nuts 133 by means of which the frame 111 is held securely in the casing. The interpolar gap of the magnet 119 which is located adjacent the upper end of one of the studs 132 is bridged by a compensator 134 of the type previously described. To maintain the compensator in position across the gap and to secure the magnet firmly in place in the frame, there are provided clamps 135, one end of each of which surrounds the upper end of one of the studs 132 between the nut 133 and the flange 120. The opposite end of one of the clamps 135 rests on the upper surface of the magnet 119 and the corresponding end of the other clamp rests on the upper surface of the compensator 134.

The spindle 135' is similar to that previously described and carries intermediate its ends and located between the rotor and the magnet a similar speed disk or drag element 136. The spindle 135' is journalled at its lower and upper ends, respectively, in a bearing in the drive shaft 116 and in a bearing threaded through the arm 124 of the T-shaped bracket 123, both of which bearings are similar to the corresponding parts shown in the preceding figures and are similarly mounted in the drive shaft and bracket arm.

As in the case of the instrument shown in Figures 1-9 the upper end of the spindle extends through its upper bearing and carries above the arm 124 of the T-shaped bracket 123 a pointer 137.

Secured at one end to and spirally surrounding a portion of the spindle 125', between the disk and the arm 124, is a hairspring 138. The opposite end of the hairspring 138 is secured to the downwardly projecting arm 139 of the spring adjuster 140 which includes a body portion resting on top of the arm 124 of the T-shaped bracket 123 and having therein an opening through which the upper end of the upper spindle bearing extends. Extending from opposite sides of the body portion of the adjuster are arms 141 which engage beneath the arm 124 of the T-shaped bracket and maintain the adjuster in frictional engagement with the arm.

The open side of the case may be closed by any suitable type of face and protecting glass, such as those shown in the preceding figures, secured to the casing in any suitable manner, as by the bezel shown in the preceding figures. It will be noted that the threaded ends of the studs 132 extend beyond the lower nuts 133 so that the instrument is adapted to be secured to the pedestal previously described in the same manner as the instrument shown in Figures 1-9.

It seems unnecessary, in view of the similarity of the instrument shown in Figures 10-12 to that shown in the preceding figures, to describe the operation thereof and the adjustment of parts.

The tachometer shown in Figures 13 and 14 includes a generally cup-shaped casing 150 provided on its open end with an outwardly extending circumferential flange 151 and having through its bottom a central opening surrounded by a downwardly extending neck 152. The frame 153 includes a cylindrical portion 154, which fits snugly within the upper end of the case and which is provided with an outwardly extending circumferential flange 155 seated on the flange 151, and a shelf portion 156 extending inwardly from the bottom wall of the cylindrical portion. The lower end of the frame is closed except for an opening 157 concentric with the cylindrical portion by a bottom 158 which extends inwardly and downwardly from the inner edges of the shelf portion 156. The bearing member 159, which has on its upper end a flange 160 seated on and secured to the edges of the bottom of the frame around the opening therein, extends through the opening in the bottom of the frame and through the neck 152, having intermediate its ends a shoulder 161 seated on the inturned end of the neck of the casing through the intermediary of a gasket or washer 162 which is provided to keep dust out of the case.

Secured to the shelf portion 156 by the bolt 163 and the rivets 164 is the cross arm 165 of the bracket 166. Extending radially inwardly from the cross arm 165 to a point somewhat short of the center of the frame is a leg 167 whose inner end 168 is stepped up with respect to the cross arm. The leg 167 is provided with a reduced radially directed extension 169 which extends to a point slightly beyond the axis of the frame and whose inner end 170 is stepped up with respect to the stepped-up portion of the leg 167.

The drive shaft 171 is similar in construction to the corresponding part shown in Figures 10—12 and is similarly arranged in the bearing member 159. The rotor 172 is similar in construction to the corresponding part shown in the preceding figures and similarly secured to the drive shaft. The spindle 173 is journalled at its lower end in a bearing which is similar to the corresponding part shown in the preceding figures, and similarly secured in the upper end of the drive shaft 171. The upper end of the spindle is journalled in a jewel carried by the jewel holder 174 which is threaded, as in the preceding figures, through a bore intersected by a slot 175 in the reduced extremity of the leg 167.

The speed disk 176 which is of similar construction to the corresponding part shown in the preceding figures and similarly secured to the spindle is located so that its upper surface is slightly below the level of the upper surface of the shelf 156.

The magnet 177 is of the horseshoe type and is seated with its web on the shelf 156 and with its legs extending parallel to the leg of the bracket 166 and equally spaced on opposite sides of spindle 173 and above the speed disk 176. The magnet is secured to the frame by a plate 178, having arcuate corner portions 179 engaging the inner wall of the cylindrical portion of the frame and lugs 180 engaging the inner sides of the legs of the magnet, and a bolt 181 extending through the plate the web of magnet and the shelf 156 and having a nut secured thereon beneath the shelf.

A hairspring 182 spirally surrounds a portion of the spindle between the speed disk and the upper bearing 174, being secured at its inner end to the spindle. There is provided in the intermediate stepped-up portion 168 of the leg of the bracket 166 an arcuate slot 183. Located beneath this stepped-up portion and having a neck portion 184 extending through the slot and provided above the upper surface of the stepped-up portion with a transverse slot through which extends a wedge 185 by means of which the adjuster may be locked in any position in the slot 183 is a hairspring adjuster 186 to which the outer end of the hairspring is attached.

The marginal edges of the pie-plate-shaped face plate 187 are seated on the flange 155 of the frame. The face plate 187 has therethrough a central opening 188 through which the reduced extension of the leg of the bracket 166 extends to a point above the face plate. The pointer 189 includes a lower horizontal portion secured to the spindle 173 between the hairspring and the upper bearing 174, an upper horizontal portion located above the upper surface of the face plate, and a vertical portion joining the two horizontal portions at a point slightly beyond the inner extremity of the stepped-up portion 168 of the bracket 166. The vertical portion of the pointer, as is obvious from the drawings, is adapted to abut against the inclined portion of the reduced extension 170 to prevent the pointer being moved to a point beyond the zero on the scale by the hairspring when movement of the rotor ceases.

Seated on the marginal edges of the face plate 187 is a protecting glass 190. The case 150, the frame 153, the face plate 187, and the glass 190 are all secured together by a bezel 191 which includes a channel portion 192 having flanges between which the flanges 151 and 155 and the marginal edges of the face plate are gripped, and an extension 193 on one of the flanges which extends upwardly and is then curved downwardly into contacting relation with the marginal edges of the glass 190.

It appears unnecessary to describe the operation and the adjustment of the various parts of the instrument shown in Figures 13 and 14 as all of these have either been described in connection with this instrument or those shown in the preceding figures or are so obvious as not to need description.

Though I have shown and described specific embodiments of my invention, it is to be understood that this has not been done with the intention of limiting my invention thereto but merely by way of example and that the scope of my invention is defined only by the appended claims.

I claim:

1. In a device of the class described, a bracket, a bearing member extending through and projecting beyond the opposite sides of the bracket, a shaft journalled in the bearing member, a spring secured to the shaft for resisting movement thereof, a U-shaped spring adjuster having an arm on each side of the bracket and an opening in one arm through which one end of the bearing member extends, spaced prongs on the other arm straddling the opposite end of the bearing member, and means connecting said spring to the adjuster.

2. In a device of the class described, a casing, a frame within the casing, a magnet on the frame, means to secure the magnet to the frame and the frame to the casing, including a stud extending through the frame and the casing, and means carried by the stud and engaging the magnet.

3. In a device of the class described, a casing, a frame within the casing, a magnet mounted on the frame, means to secure the magnet to the frame and the frame to the casing, including a stud extending through the frame and the casing, and means on the stud between the frame and the casing to space the frame from the casing.

4. In a device of the class described, a frame, a bearing member extending outwardly from the frame, a shaft journalled in the bearing member, a key to prevent longitudinal movement of the shaft, and a casing surrounding the frame and having an extension surrounding a portion of the bearing member and maintaining said key in position.

5. In an instrument of the class described, a bracket, a bearing member carried by the bracket, a shaft journalled in the bearing member, a spring adjuster which includes a pair of arms which are located on opposite sides of the bracket and through one of which extends an opening through which a portion of the bearing member extends, and a spring secured to the shaft and to the spring adjuster for resisting rotation of the shaft.

JOSEPH ZUBATY.